(12) United States Patent
Ikeda

(10) Patent No.: US 11,682,523 B2
(45) Date of Patent: Jun. 20, 2023

(54) MULTILAYER CERAMIC CAPACITOR

(71) Applicant: Murata Manufacturing Co., Ltd., Nagaokakyo (JP)

(72) Inventor: Mitsuru Ikeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/232,365

(22) Filed: Apr. 16, 2021

(65) Prior Publication Data

US 2021/0335541 A1  Oct. 28, 2021

(30) Foreign Application Priority Data

Apr. 23, 2020  (JP) .................................. 2020-076447

(51) Int. Cl.
*H01G 4/012* (2006.01)
*H01G 4/008* (2006.01)
(Continued)

(52) U.S. Cl.
CPC ............. *H01G 4/012* (2013.01); *H01G 4/008* (2013.01); *H01G 4/1218* (2013.01); *H01G 4/30* (2013.01)

(58) Field of Classification Search
CPC ........ H01G 4/30; H01G 4/012; H01G 4/1227; H01G 4/2325; H01G 4/008; H01G 4/0085;
(Continued)

(56) References Cited

U.S. PATENT DOCUMENTS

2010/0008017 A1\* 1/2010 Ito ............................ H01G 4/30
361/301.4
2015/0340156 A1\* 11/2015 Masunari ............. H01G 4/1227
361/301.4
(Continued)

FOREIGN PATENT DOCUMENTS

JP 2006-332601 A 12/2006
JP 2007258279 A 10/2007
(Continued)

OTHER PUBLICATIONS

First Office Action in CN202110427837.4, dated Jun. 27, 202, 11 pages.
(Continued)

*Primary Examiner* — Michael P McFadden
(74) *Attorney, Agent, or Firm* — Keating & Bennett, LLP

(57) ABSTRACT

A multilayer ceramic capacitor includes a multilayer body and two external electrodes. The multilayer body includes a multilayer main body including an inner layer portion including dielectric layers and internal electrode layers alternately stacked, and outer layer portions on opposite sides of the inner layer portion in a stacking direction, two side gap portions on opposite sides in a width direction, main surfaces on opposite sides in the stacking direction, side surfaces on opposite sides in the width direction, and end surfaces respectively provided on opposite sides in a length direction. The two external electrodes are provided at the end surfaces, each including a foundation electrode layer in contact with the multilayer body, and a conductive resin layer on the foundation electrode layer. An end region of the internal electrode layers in contact with the foundation electrode layer is thicker than other regions of the internal electrode layers.

18 Claims, 9 Drawing Sheets

(51) Int. Cl.
*H01G 4/12* (2006.01)
*H01G 4/30* (2006.01)

(58) Field of Classification Search
CPC .......... H01G 4/12; H01G 4/224; H01G 4/228; H01G 4/1218
See application file for complete search history.

(56) References Cited

U.S. PATENT DOCUMENTS

| | | | |
|---|---|---|---|
| 2016/0141103 A1* | 5/2016 | Hamanaka | H01G 4/232 361/301.4 |
| 2016/0196917 A1* | 7/2016 | Lim | H01G 4/012 361/301.4 |
| 2016/0247632 A1* | 8/2016 | Tsukida | H01G 4/0085 |
| 2017/0018363 A1 | 1/2017 | Tanaka et al. | |
| 2018/0061577 A1* | 3/2018 | Yasuda | H01G 4/0085 |
| 2020/0402717 A1* | 12/2020 | Lee | H01G 4/1218 |

FOREIGN PATENT DOCUMENTS

| | | |
|---|---|---|
| JP | 2013-073952 A | 4/2013 |
| JP | 2015043423 A | 3/2015 |
| KR | 1020190116113 A | 10/2019 |

OTHER PUBLICATIONS

Second Office Action in CN202110427837.4, dated Jan. 19, 2023, 8 pages.

* cited by examiner

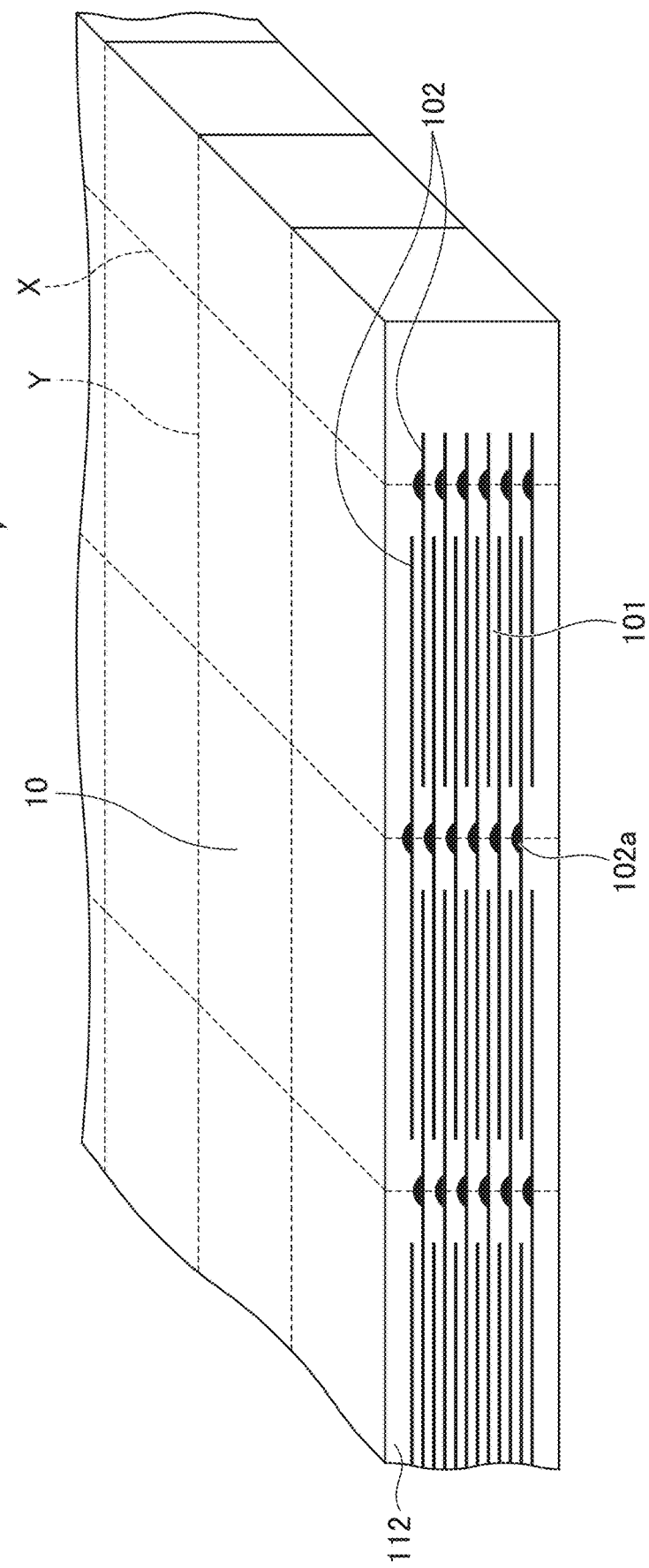

MULTILAYER CERAMIC CAPACITOR

CROSS REFERENCE TO RELATED APPLICATIONS

This application claims the benefit of priority to Japanese Patent Application No. 2020-076447 filed on Apr. 23, 2020. The entire contents of this application are hereby incorporated herein by reference.

BACKGROUND OF THE INVENTION

1. Field of the Invention

The present invention relates to a multilayer ceramic capacitor.

2. Description of the Related Art

Recently, a large-capacitance and small-size multilayer ceramic capacitor has been demanded. Such a multilayer ceramic capacitor includes an inner layer portion in which dielectric layers made of a ferroelectric material having relatively high dielectric constant and internal electrodes are alternately stacked. Furthermore, dielectric layers as outer layer portions are provided on the upper and lower portions of the inner layer portion, thereby forming a rectangular multilayer body. Furthermore, side gap portions are provided on both side surfaces of the rectangular multilayer body in the width direction, and external electrodes are provided on both end surfaces thereof in the longitudinal direction.

Conventionally, such a multilayer ceramic capacitor has been known which further includes a conductive resin in the external electrodes in order to mitigate stress (see, for example, Japanese Unexamined Patent Application, Publication No. 2013-73952).

However, although such conductive resin has conductivity, it also has a high resistance value as compared to metal. If the resistance value is high, there may be a case in which the capacitance of a multilayer ceramic capacitor does not work as designed, for example.

SUMMARY OF THE INVENTION

Preferred embodiments of the present invention provide multilayer ceramic capacitors that are each capable of reducing an overall resistance value of an electrode.

A multilayer ceramic capacitor according to a preferred embodiment of the present invention includes a multilayer body, and two external electrodes. The multilayer body includes a multilayer main body including an inner layer portion in which a plurality of dielectric layers and a plurality of internal electrode layers are alternately stacked, and two outer layer portions on opposite sides of the inner layer portion in a stacking direction, two side gap portions on opposite sides of the multilayer main body in a width direction intersecting the stacking direction, two main surfaces on opposite sides in the stacking direction, two side surfaces on opposite sides in the width direction intersecting the stacking direction, two end surfaces on opposite sides in a length direction intersecting the stacking direction and the width direction, the two external electrodes each being provided at one of the two end surfaces of the multilayer body, and each including a foundation electrode layer including conductive metal and a glass component and in contact with the multilayer body, and a conductive resin layer including thermosetting resin and a metal component and in contact with the foundation electrode layer, and an end region of the internal electrode layer in contact with the foundation electrode layer is thicker than regions other than the end region of the internal electrode layer.

According to preferred embodiments of the present invention, it is possible to provide multilayer ceramic capacitors that are each capable of reducing an overall resistance value of an electrode.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a schematic perspective view of a mother block.

DETAILED DESCRIPTION OF THE PREFERRED EMBODIMENTS

Figure 1:
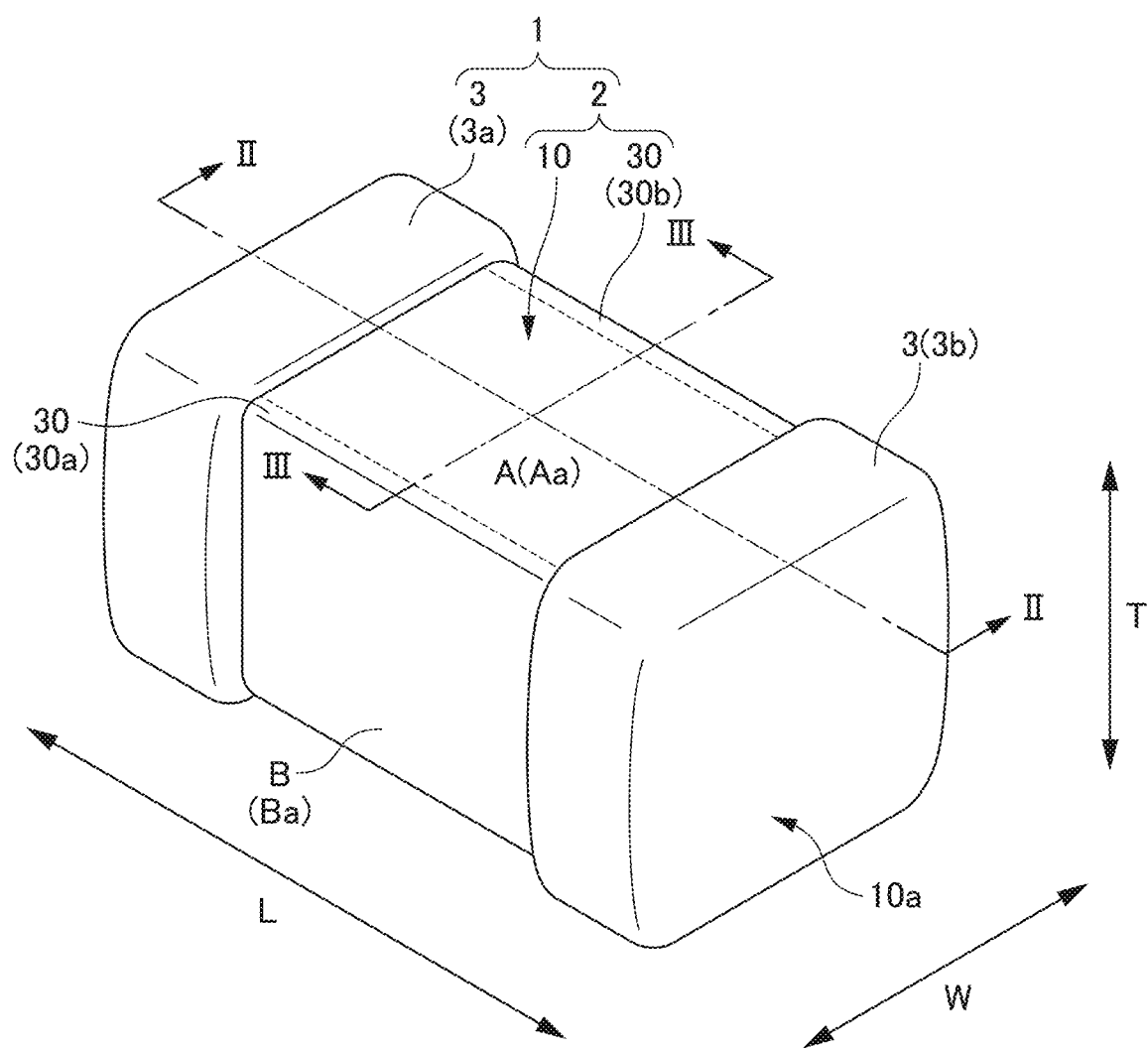
FIG. 1 is a schematic perspective view of a multilayer ceramic capacitor according to a preferred embodiment of the present invention.
Figure 2:
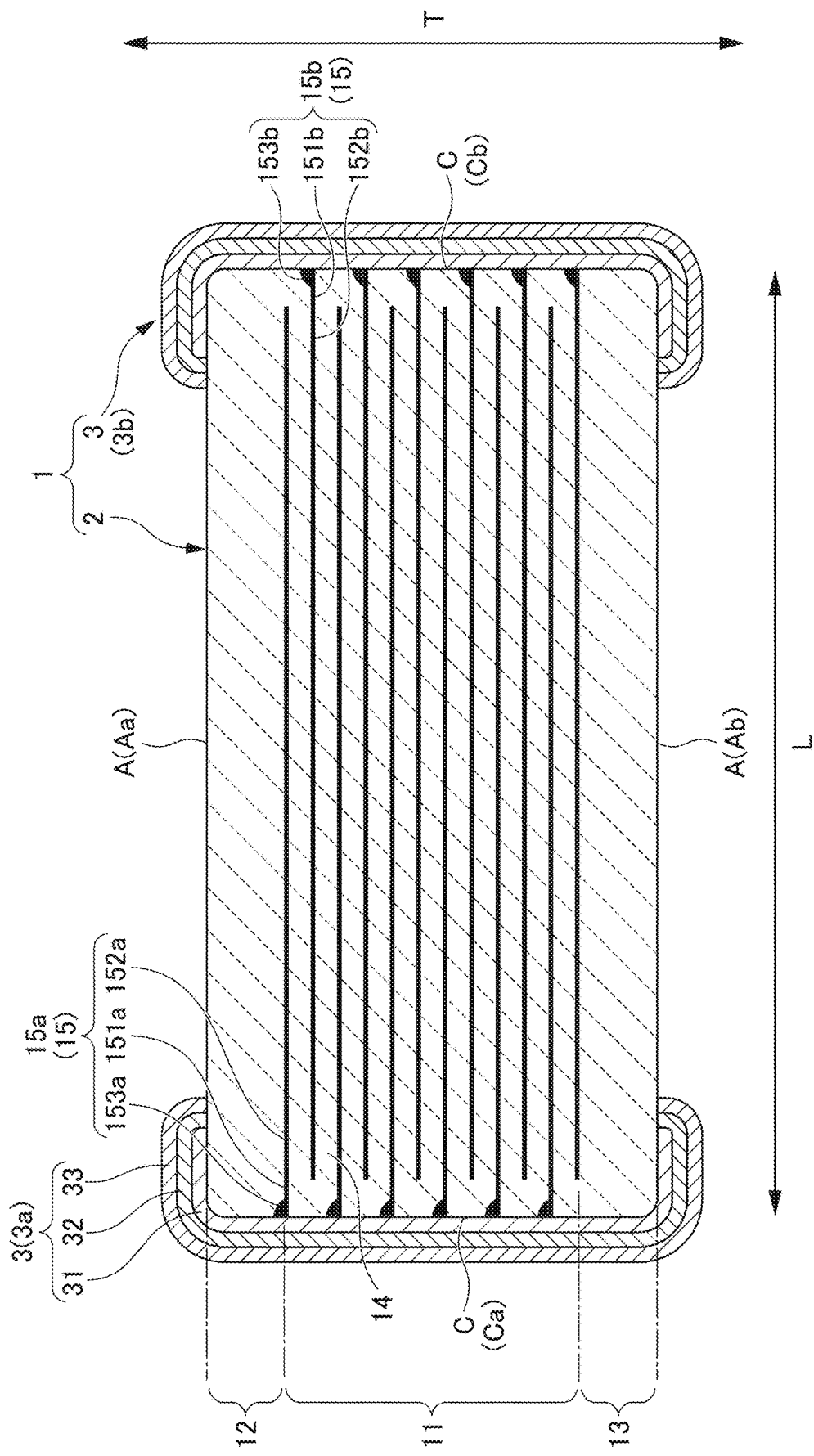
FIG. 2 is a cross-sectional view taken along the line II-II of the multilayer ceramic capacitor of FIG. 1.
Figure 3:
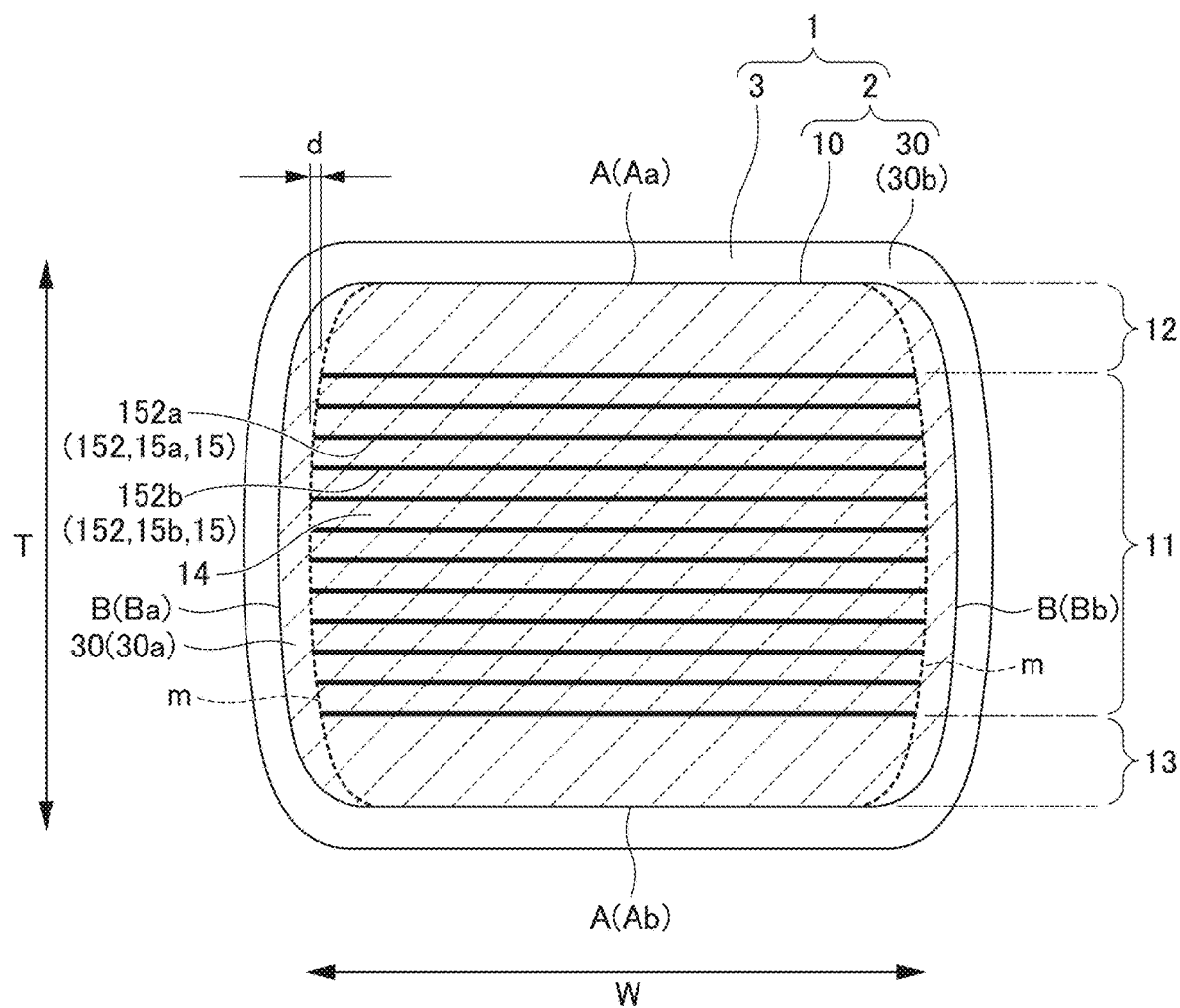
FIG. 3 is a cross-sectional view taken along the line III-III of the multilayer ceramic capacitor of FIG. 1.

Hereinafter, multilayer ceramic capacitors according to preferred embodiments of the present invention will be described. FIG. 1 is a schematic perspective view of a multilayer ceramic capacitor 1 according to a preferred embodiment of the present invention. FIG. 2 is a cross-sectional view taken along the line II-II of the multilayer ceramic capacitor 1 in FIG. 1. FIG. 3 is a cross-sectional view taken along the line III-III of the multilayer ceramic capacitor 1 in FIG. 1.

The multilayer ceramic capacitor 1 has a rectangular or substantially rectangular shape, and includes a multilayer body 2 and a pair of external electrodes 3 provided at both ends of the multilayer body 2. The multilayer body 2 includes an inner layer portion 11 including a plurality of sets of a dielectric layer 14 and an internal electrode layer 15.

In the following description, as a term representing the orientation of the multilayer ceramic capacitor 1, the direction in which the pair of external electrodes 3 are provided in the multilayer ceramic capacitor 1 is defined as the length direction L. The direction in which the dielectric layers 14 and the internal electrode layers 15 are stacked (or laminated) is defined as the stacking direction T. The direction intersecting both the length direction L and the stacking direction T is defined as the width direction W. It should be noted that, in the present preferred embodiment, the width direction is orthogonal or substantially orthogonal to both of the length direction L and the stacking direction T.

Figure 4:
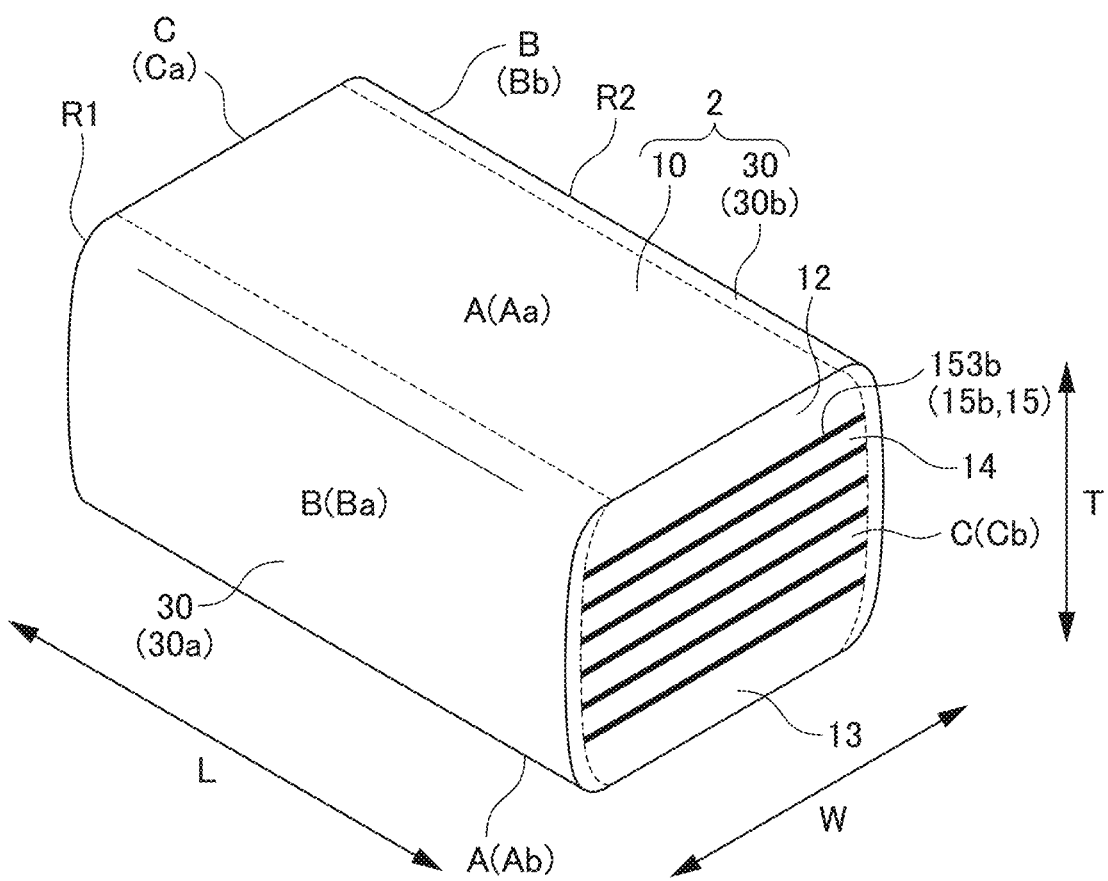
FIG. 4 is a schematic perspective view of a multilayer body according to a preferred embodiment of the present invention.
Figure 5:
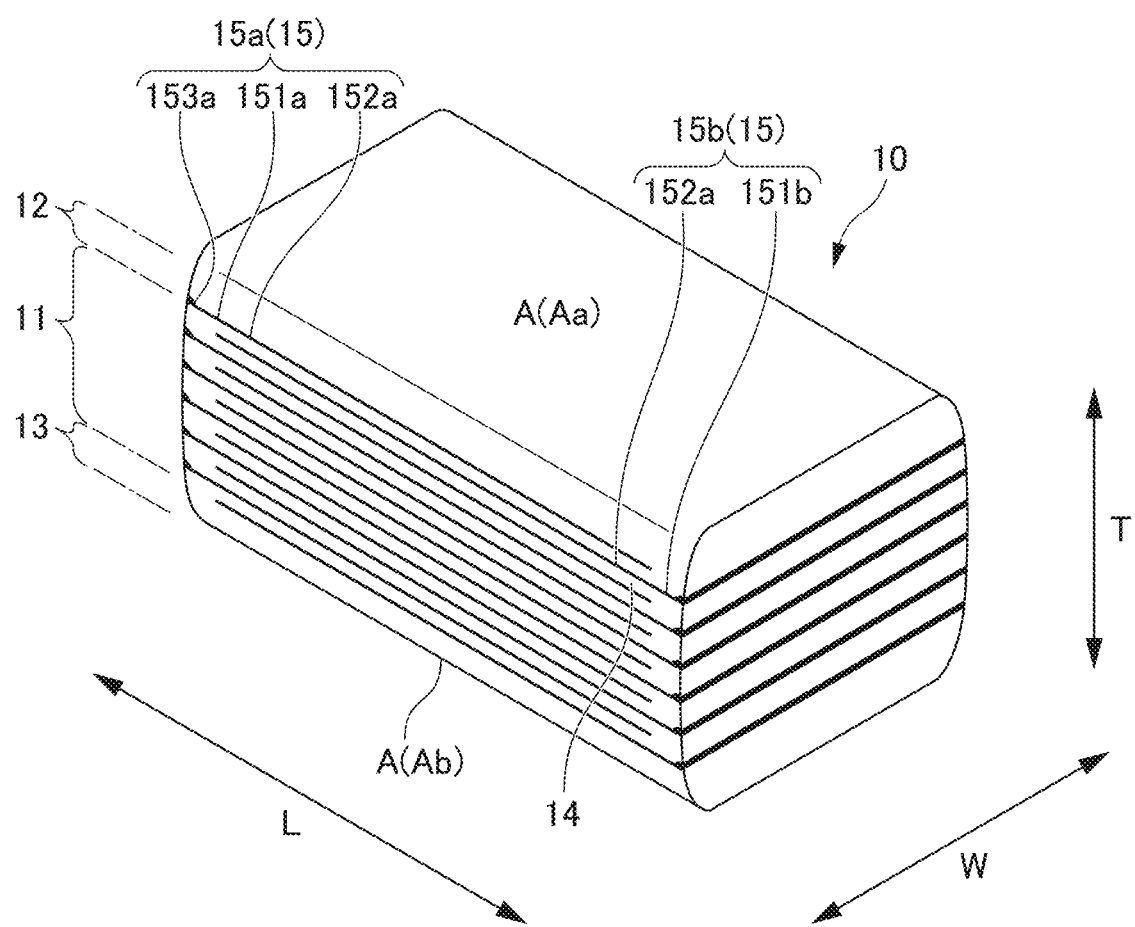
FIG. 5 is a schematic perspective view of a main body of the multilayer body of FIG. 4.

FIG. 4 is a schematic perspective view of the multilayer body 2. The multilayer body 2 includes a multilayer main body 10, and a side gap portion 30. FIG. 5 is a schematic perspective view of the multilayer main body 10.

In the following description, among the six outer surfaces of the multilayer body 2 shown in FIG. 4, a pair of outer surfaces on opposite sides in the stacking direction T are respectively defined as a first main surface Aa and a second main surface Ab, a pair of outer surfaces on opposite sides in the width direction W are respectively defined as a first side surface Ba and a second side surface Bb, and a pair of outer surfaces on opposite sides in the length direction L are respectively defined as a first end surface Ca and a second end surface Cb.

It should be noted that, in a case in which it is not necessary to specifically distinguish the first main surface Aa and the second main surface Ab from each other, they will be collectively described as the main surface A, in a case in which it is not necessary to specifically distinguish the first side surface Ba and the second side surface Bb from each other, they will be collectively described as the side surface B, and in a case in which it is not necessary to specifically distinguish the first end surface Ca and the second end surface Cb from each other, they will be collectively described as the end surface C.

The multilayer body 2 is preferably rounded at a corner R1 and a ridge R2. The corner R1 is a portion where the main surface A, the side surface B, and the end surface C intersect. The ridge R2 is a portion where two surfaces of the multilayer body 2, i.e., the main surface A and the side surface B, the main surface A and the end surface C, or the side surface B and the end surface C intersect.

In addition, surface irregularities and the like may be provided on a portion or all of the main surface A, the side surface B, and the end surface C of the multilayer body 2. The dimension of the multilayer body 2 is not particularly limited. However, for example, it is preferable that the dimension in the length direction L is about 0.2 mm or more and about 10 mm or less, the dimension in the width direction W is about 0.1 mm or more and about 10 mm or less, and the dimension in the stacking direction T is about 0.1 mm or more and about 5 mm or less.

As shown in FIG. 5, the multilayer main body 10 includes the inner layer portion 11, an upper outer layer portion 12 disposed adjacent to the first main surface Aa of the inner layer portion 11, and a lower outer layer portion 13 disposed adjacent to the second main surface Ab.

The inner layer portion 11 includes the plurality of sets of the dielectric layer 14 and the internal electrode layer 15 which are alternately stacked along the stacking direction T.

The dielectric layer 14 preferably has a thickness of, for example, about 0.5 µm or less. The dielectric layer 14 is made of a ceramic material. As the ceramic material, for example, a dielectric ceramic including $BaTiO_3$ as a main component may preferably be used. Furthermore, a ceramic material obtained by adding at least one of sub-components such as, for example, Mn compounds, Fe compounds, Cr compounds, Co compounds, and Ni compounds to these main components may be used. It should be noted that the number of dielectric layers 14 including the multilayer main body 10 including the upper outer layer portion 12 and the lower outer layer portion 13 is preferably fifteen sheets or more and 700 sheets or less, for example.

The internal electrode layer 15 includes a plurality of first internal electrode layers 15a and a plurality of second internal electrode layers 15b. The first internal electrode layers 15a and the second internal electrode layers 15b are alternately arranged. It should be noted that, when it is not necessary to distinguish the first internal electrode layer 15a from the second internal electrode layer 15b, they will be collectively described as the internal electrode layer 15.

The first internal electrode layer 15a includes a first opposing portion 152a provided opposite to the second internal electrode layer 15b, a first lead-out portion 151a extending from the first opposing portion 152a to the side of the first end surface Ca, and a first end region 153a located at the end of the first lead-out portion 151a on the side of the first end surface Ca. The first end region 153a is exposed on the first end surface Ca, and is electrically connected to a first external electrode 3a to be described later.

In the first internal electrode layer 15a, the thickness of the first end region 153a in the stacking direction T is greater than the thickness of the first opposing portion 152a and the thickness of the first lead-out portion 151a in the stacking direction T.

The second internal electrode layer 15b includes a second opposing portion 152b provided opposite to the first internal electrode layer 15a, a second lead-out portion 151b extending from the second opposing portion 152b to the second end surface Cb, and a second end region 153b located at the end of the second lead-out portion 151b on the side of the second end surface Cb.

The second end region 153b is electrically connected to a second external electrode 3b to be described later. In the second internal electrode layer 15b, the thickness of the second end region 153b in the stacking direction T is greater than the thickness of the second opposing portion 152b and the thickness of the second lead-out portion 151b in the stacking direction T.

According to the internal electrode layer 15 described above, charge is accumulated in the first opposing portion 152a of the first internal electrode layer 15a and the second opposing portion 152b of the second internal electrode layer 15b, such that the characteristics of the capacitor are provided.

It should be noted that, in a case in which it is not necessary to specifically distinguish the first opposing portion 152a and the second opposing portion 152b from each other, they will be collectively described as the opposing portion 152. Furthermore, in a case in which it is not necessary to specifically distinguish the first lead-out portion 151a and the second lead-out portion 151b from each other, they will be collectively described as the lead-out portion 151. In a case in which it is not necessary to specifically distinguish the first end region 153a and the second end region 153b from each other, they will be described as the end region 153.

As shown in FIG. 3, in the WT cross-section which is a cross section of the width direction W and the stacking direction T passing through the center or approximate center of the multilayer body 2, the positional deviation d in the stacking direction T between the ends in the width direction W of the first internal electrode layer 15a and the second internal electrode layer 15b which are vertically adjacent to each other in the stacking direction T is preferably, for example, about 0.5 µm or less. That is, the ends in the width direction W of the first internal electrode layer 15a and the second internal electrode layer 15b vertically adjacent to each other in the stacking direction T is at the same position or substantially at the same position on the width direction W, and the positions of the ends are aligned in the stacking direction T.

On the other hand, in the same or similar manner, in the WT cross-section which is a cross section of the width direction W and the stacking direction T passing through the center of the multilayer body 2 shown in FIG. 3, a line m shown by a dotted line in FIG. 3 connecting all of the ends in the width direction W of the first internal electrode layers 15a and the second internal electrode layers 15b provided adjacent to each other in the stacking direction T is slightly convex toward the outside.

In other words, the internal electrode layer 15 is pressed and extends at the center or approximate center portion in the stacking direction T of the first internal electrode layer 15a and the second internal electrode layer 15b. It should be noted that the convex shape can also be referred to as a drum shape. That is, the ends in the width direction W of the first internal electrode layer 15a and the second internal electrode layer 15b are at the same position or substantially at the same position in the width direction W when the adjacent two layers in the stacking direction T are viewed. However, when the ends along the entire length in the stacking direction T are viewed, they are in a slightly convex shape toward the outside. The reason for such convexity will be described later.

The internal electrode layer 15 is preferably made of a metallic material such as Ni, Cu, Ag, Pd, or Au, or Ag—Pd alloy, for example. The thickness of the internal electrode layer 15 (i.e., the lead-out portion 151 and the opposing portion 152 other than the end region 153) is preferably about 0.5 μm or more and about 2.0 mm or less, for example. The end region 153 gradually becomes thicker as it approaches the external electrode 3 from the lead-out portion 151. The end region 153 preferably has, for example, a right triangular or substantially right triangular shape, an oval shape, or a quarter-circle shape in a cross section shown in FIG. 2. The difference in thickness between the thickest portion in the end region 153 and the portions other than the end region 153 is preferably about 0.2 μm or less, for example.

Furthermore, the number of the internal electrode layers 15 is preferably, for example, fifteen or more and 200 or less in total of the first internal electrode layer 15a and the second internal electrode layer 15b.

The upper outer layer portion 12 and the lower outer layer portion 13 are made of the same material as the dielectric layer 14 of the inner layer portion 11. Furthermore, for example, the thickness of the upper outer layer portion 12 is preferably about 20 μm or more and about 60 μm or less, and the thickness of the lower outer layer portion 13 is about 20 μm or more and about 40 μm or less.

The side gap portion 30 includes a first side gap portion 30a provided adjacent to the first side surface Ba of the multilayer main body 10 and a second side gap portion 30b provided adjacent to the second side surface Bb of the multilayer main body 10.

It should be noted that, in a case in which it is not necessary to specifically distinguish the first side gap portion 30a and the second side gap portion 30b from each other, they will be collectively described as the side gap portion 30.

The side gap portion 30 covers the end on the side in the width direction W of the internal electrode layer 15 which is exposed on both sides of the multilayer main body 10 along its end. The side gap portion 30 is made of the same material as the dielectric layer 14, and further includes, for example, Mg as a sintering aid. Mg migrates to the side of the internal electrode layer 15 side during sintering of the side gap portion 30, such that Mg is segregated on the side of the side gap portion 30 in contact with the internal electrode layer 15.

Furthermore, an interface is provided between the multilayer main body 10 and the side gap portion 30. The thickness of the side gap portion 30 is preferably, for example, about 20 μm, and more preferably about 10 μm or less.

The particle size of the grains of the dielectric in the side gap portion 30 decreases from the inner layer toward the outside. For example, the particle size of the grains is preferably about 400 nm or more and about 450 nm or less at the outermost side, and about 600 nm or more at the innermost side, and the particle size of the innermost grains is preferably about 1.5 times or more than the particle size of the outermost grains. It should be noted that, regarding the particle size of the grains, the side gap portion 30 is assumed to be divided into a plurality of regions each having a dimension of about 20 nm in the width direction from the side surface side at the center or approximate center portion in the stacking direction T of the side gap portion 30, and for each region, the area of the particle size is measured, and the area is converted into a circle equivalent diameter to determine the average particle diameter in each region. The region of less than about 20 nm will have the average particle diameter to be defined within the region.

Furthermore, although the side gap portion 30 is a single layer in the present preferred embodiment, the present invention is not limited thereto, and the side gap portion 30 may have a two-layer structure including an outer side gap layer located on the outside and an inner side gap layer located on the side of the internal electrode layer 15.

It should be noted that, as described above, regarding the internal electrode layer 15, a line connecting the ends of the internal electrode layers 15 on the side of the side surface B in the WT cross section has a convex shape toward the outside. Therefore, the side gap portion 30 provided on the outside also has a convex shape toward the outside in the WT cross section.

The external electrode 3 includes a first external electrode 3a provided on the first end surface Ca of the multilayer body 2, and a second external electrode 3b provided on the second end surface Cb of the multilayer body 2. It should be noted that, in a case in which it is not necessary to specifically distinguish between the first external electrode 3a and the second external electrode 3b, they will be collectively described as an external electrode 3. The external electrode 3 covers not only the end surface C, but also a portion of each of the main surface A and the side surface B close to the end surface C.

As described above, the end of the first lead-out portion 151a of the first internal electrode layer 15a is exposed at the first end surface Ca and electrically connected to the first external electrode 3a. Furthermore, the end of the second lead-out portion 151b of the second internal electrode layer 15b is exposed to the second end surface Cb, and is electrically connected to the second external electrode 3b. This provides a structure in which a plurality of capacitor elements are electrically connected in parallel between the first external electrode 3a and the second external electrode 3b.

Furthermore, the external electrode 3 has a three-layer structure including a foundation electrode layer 31, a conductive resin layer 32 provided on the foundation electrode layer 31, and a plated layer 33 provided on the conductive resin layer 32.

The foundation electrode layer 31 is provided, for example, by applying and firing a conductive paste including a conductive metal and glass. As the conductive metal of the foundation electrode layer 31, for example, Cu, Ni, Ag, Pd, Ag—Pd alloy, Au or the like can be used. The conductive resin layer 32 covers the foundation electrode layer 31.

The conductive resin layer 32 has any suitable configuration including a thermosetting resin and a metal component. As specific examples of the thermosetting resin, various known thermosetting resins such as epoxy resin, phenolic resin, urethane resin, silicone resin, polyimide resin, and the like can be used. As the metal component, for example, Ag or a metal powder coated with Ag on the surface of the base metal powder can be used.

The plated layer 33 preferably includes plating of one metal or an alloy including the metal selected from the group consisting of, for example, Cu, Ni, Su, Ag, Pd, Ag—Pd alloy, Au, or the like.

Thus, since the conductive resin layer 32 includes a thermosetting resin, for example, the conductive resin layer 32 is more flexible than the foundation electrode layer 31 made of a plated film or a fired product of a conductive paste. Therefore, even when an impact caused by physical shock or thermal cycling to the multilayer ceramic capacitor 1 is applied, the conductive resin layer 32 defines and functions as a buffer layer, such that the generation of cracks in the multilayer ceramic capacitor 1 is prevented, piezoelectric vibration is easily absorbed, and an effect of reducing or preventing the "acoustic noise" is provided.

By including the conductive resin layer 32 as described above, impact is absorbed, and the effect of reducing or preventing "acoustic noise" is obtained. However, the conductive resin layer 32 has high electrical resistance relative to the other layers in the external electrodes 3.

In this regard, as shown in FIGS. 2, 4 and 5, in the multilayer ceramic capacitor 1 of the present preferred embodiment, the thickness in the stacking direction T of the end region 153 of the internal electrode layer 15 in contact with the foundation electrode layer 31 on the side of the end surface C is greater than the thickness in the stacking direction T of regions other than the end region 153 of the internal electrode layer 15. Furthermore, the difference in thickness between the end region 153 and the regions other than the end region 153 is preferably, for example, about 0.2 μm or less.

When the end region 153 of the internal electrode layer in contact with the foundation electrode layer 31 becomes thicker, the cross-sectional area of the end region 153 of the internal electrode layer 15 becomes greater. In view of this, the electrical resistance of the internal electrode layer 15, i.e., the overall electrical resistance of an electrode including the internal electrode layer 15 and the external electrode 3 is reduced, and thus, current flows easily. This makes it possible to improve responsiveness in the multilayer ceramic capacitor 1.

Figure 6:
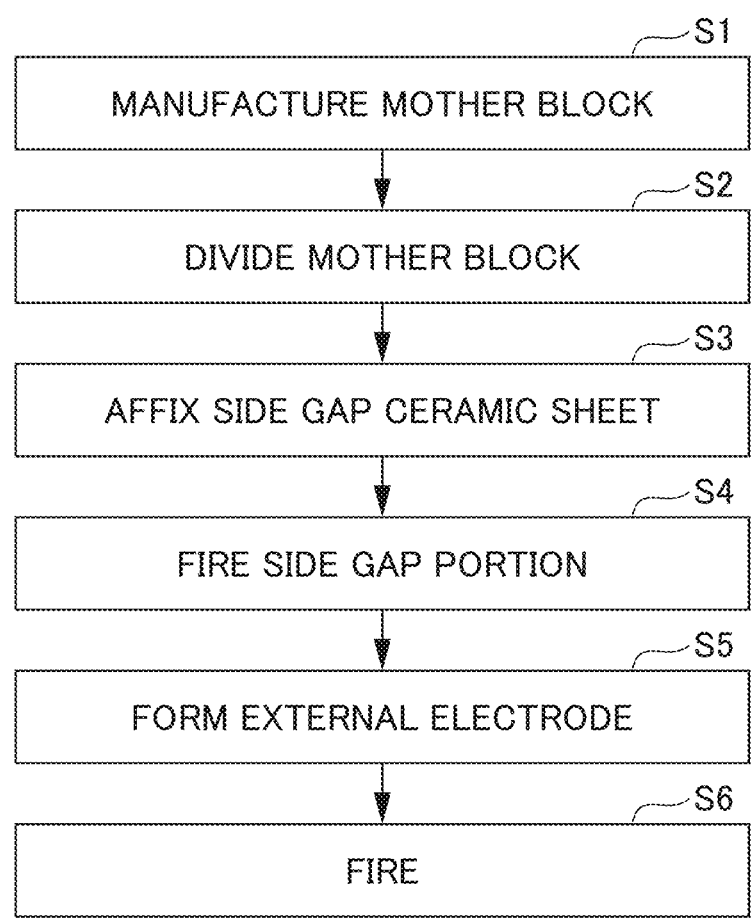
FIG. 6 is a flowchart for explaining a non-limiting example of a method of manufacturing a multilayer ceramic capacitor according to a preferred embodiment of the present invention.
Figure 7:
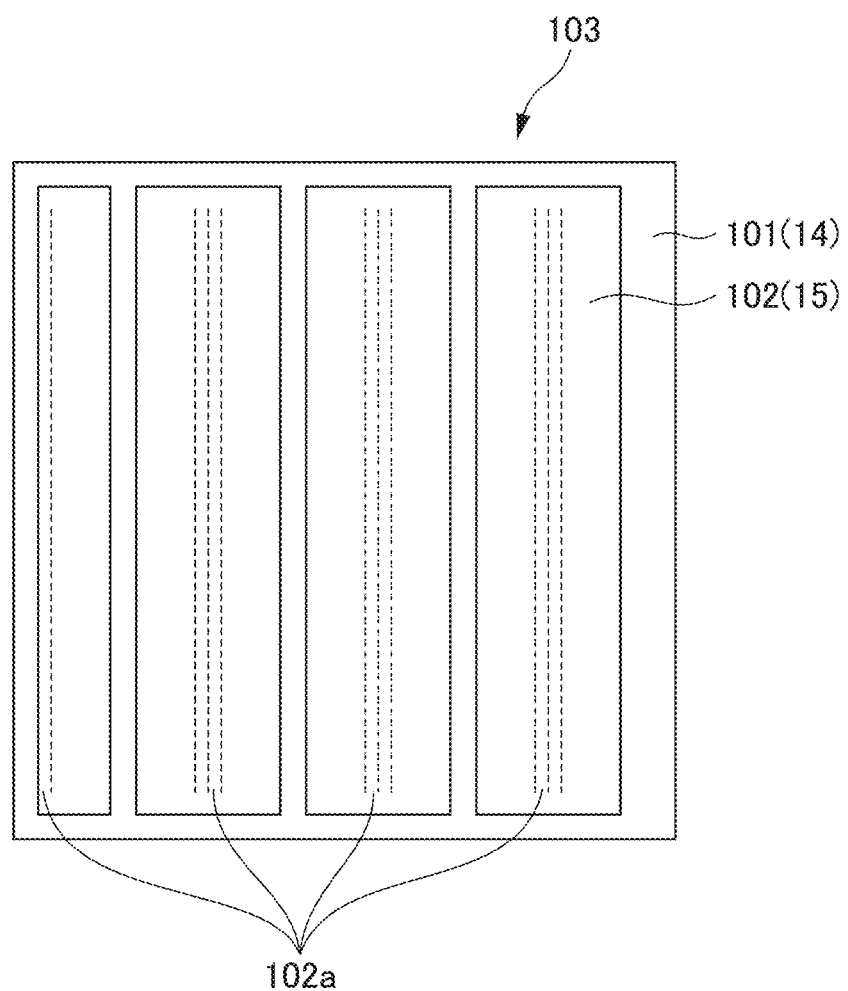
FIG. 7 is a schematic plan view of material sheets.
Figure 8:
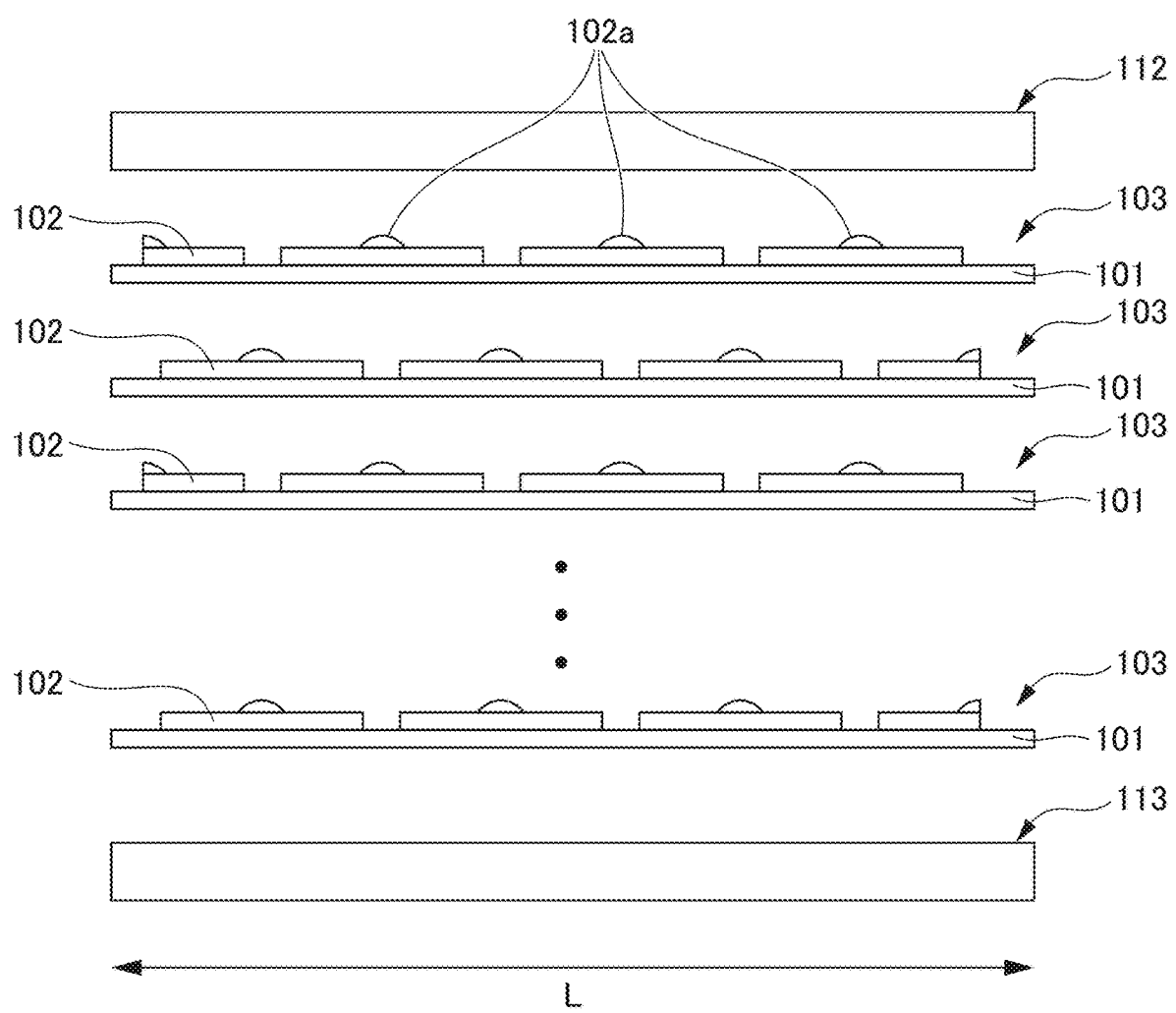
FIG. 8 is a schematic view showing a stacked state of the material sheets.

FIG. 6 is a flowchart for explaining a non-limiting example of a manufacturing method of the multilayer ceramic capacitor 1 according to a preferred embodiment of the present invention. FIG. 7 is a schematic plan view of material sheets 103. FIG. 8 is a schematic view showing a stacked state of the material sheets 103. FIG. 9 is a schematic perspective view of a mother block 110.

Mother Block Manufacturing Step S1

First, a ceramic slurry including a ceramic powder, a binder, and a solvent is prepared. The ceramic slurry is formed in a sheet shape on a carrier film by using a die coater, gravure coater, micro gravure coater, or the like, thereby manufacturing a multilayer ceramic green sheet 101.

Subsequently, the conductive paste is printed onto the multilayer ceramic green sheet 101 by screen printing, ink jet printing, gravure printing or the like, for example, so as to have a strip-shaped pattern, thus forming a conductive pattern 102. At this time, in the belt-shaped conductive patterns 102, when forming the multilayer main body 10 by cutting, for example, in order to make portions on both ends of the multilayer main body 10 in the length direction L thicker, printing of a conductive paste on such portions is performed a plurality of times.

Thus, as shown in FIG. 7, the material sheet 103 is provided in which the conductive pattern 102 defining and functioning as the internal electrode layer 15 including a swelled center portion 102a in the length direction L is printed, on the surface of the multilayer ceramic green sheet 101 defining and functioning as the dielectric layer 14.

Subsequently, as shown in FIG. 8, a plurality of material sheets 103 are stacked. More specifically, the plurality of material sheets 103 are stacked such that the strip-shaped conductive patterns 102 are directed in the same direction, and the strip-shaped conductive patterns 102 are shifted by half a pitch in the width direction between the adjacent material sheets 103. Furthermore, an upper outer layer portion ceramic green sheet 112 defining and functioning as the upper outer layer portion 12 is stacked on one side of the plurality of stacked material sheet 103, while a lower outer layer portion ceramic green sheet 113 defining and functioning as the lower outer layer portion 13 is stacked on the other side thereof.

Subsequently, the upper outer layer portion ceramic green sheet 112, the plurality of stacked material sheets 103, and the lower outer layer portion ceramic green sheet 113 are subjected to thermocompression bonding. As a result, the mother block 110 shown in FIG. 9 is formed.

Mother Block Dividing Step S2

Next, as shown in FIG. 9, the mother block 110 is divided along a cutting line X and a cutting line Y intersecting the cutting line X corresponding to the dimension of the multilayer main body 10. At this time, the swelled center portion 102a in the conductive pattern 102 is cut along the cutting line X. It should be noted that, in the present preferred embodiment, the cutting line Y is orthogonal or substantially orthogonal to the cutting line X. As a result, a plurality of multilayer main bodies 10 are manufactured, each including thicker end regions 153 of the internal electrode layers 15 in contact with the foundation electrode layer 31 as shown in FIG. 5.

Side Gap Portion Ceramic Green Sheet Affixing Step S3

Next, a ceramic slurry in which Mg is added as a sintering aid to the same dielectric powder as that of the multilayer ceramic green sheet 101 is produced. Then, a ceramic slurry is applied on the resin film, and dried to produce a side gap portion ceramic green sheet.

Then, by affixing the side gap portion ceramic green sheet on the side portion where the internal electrode layer 15 of the multilayer main body 10 is exposed, the layer is formed as the side gap portion 30. At this moment, the side gap ceramic green sheet is pressed so as to cover the side portion where the internal electrode layer 15 of the multilayer main body 10 is exposed. Therefore, as described above, the end in the width direction W of the first internal electrode layer 15a and the end in the width direction W of the second internal electrode layer 15b are pressed by the side gap ceramic green sheet so that the upper and lower ends in the stacking direction T are slightly withdrawn inward. With such a configuration, in the WT cross-section which is a cross section of the width direction W and the stacking direction T passing through the center of the multilayer body 2, a line shown by a dotted line in FIG. 3 connecting the ends on the sides of the side surface B of the first internal electrode layers 15 is slightly convex toward the outside.

Side Gap Portion Firing Step S4

The multilayer main body 10 on which the layer which becomes the side gap portion 30 is provided is subjected to degreasing treatment in a nitrogen atmosphere under a predetermined condition, then fired at a predetermined temperature in a nitrogen-hydrogen-steam mixed atmosphere, and sintered to thereby include the multilayer body 2.

Here, Mg of the side gap portion 30 migrates to the side of the internal electrode layer 15 during sintering. Thus, after sintering, Mg in the side gap portion 30 is segregated on the side of the inner electrode layer. Furthermore, the dielectric layer 14 and the side gap portion 30 are made of the same or substantially the same material. However, since the side gap portion 30 is affixed to the multilayer main body 10 including the dielectric layer 14, the interface is provided between the side gap portion 30 and the multilayer main body 10 even after sintering.

External Electrode Forming Step S5

Next, at both ends of the multilayer body 2, the foundation electrode layer 31, the conductive resin layer 32, and the plated layer 33 are sequentially formed to provide the external electrode 3.

Firing Step S6

Then, the external electrodes 3 are formed on the both ends of the multilayer body 2, following which a resulting multilayer body 2 is heated at a set firing temperature for a predetermined time in a nitrogen atmosphere. Thus, the multilayer ceramic capacitor 1 is manufactured.

At this time, the thickness of the end region 153 of the internal electrode layer 15 exposed on the end surface C is thicker in the stacking direction T than the thickness of regions other than the end region 153 of the internal electrode layer 15. Therefore, the cross-sectional area of the portion connecting the internal electrode layer 15 and the foundation electrode layer 31 becomes larger. In such a multilayer ceramic capacitor 1, the electrical resistance becomes smaller, and current flows easily. Therefore, it is possible to improve responsiveness in the multilayer ceramic capacitor 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body; and
   two external electrodes; wherein
   the multilayer body includes:
   a multilayer main body including an inner layer portion including a plurality of dielectric layers and a plurality of internal electrode layers alternately stacked, and two outer layer portions on opposite sides of the inner layer portion in a stacking direction;
   two side gap portions on opposite sides of the multilayer main body in a width direction intersecting the stacking direction;
   two main surfaces on opposite sides in the stacking direction;
   two side surfaces on opposite sides in the width direction intersecting the stacking direction; and
   two end surfaces on opposite sides in a length direction intersecting the stacking direction and the width direction;
   each of the two external electrodes is provided at one of the two end surfaces of the multilayer body, and each includes a foundation electrode layer including conductive metal and a glass component and in contact with the multilayer body, and a conductive resin layer including thermosetting resin and a metal component and in contact with the foundation electrode layer;
   an end region of each of the plurality of internal electrode layers in contact with the foundation electrode layer is thicker than regions other than the end region of each of the plurality of internal electrode layers;
   the end region of each of the plurality of internal electrode layers has one of a right triangular or substantially right triangular shape, an oval shape, and a quarter-circle shape in a cross sectional view;
   the plurality of internal electrode layers include a plurality of first internal electrode layers that are connected to one of the two external electrodes, and a plurality of second internal electrode layers that are connected to another of the two external electrodes; and
   in the stacking direction, the region of each of the plurality of internal electrode layers that is thicker overlaps only one of the plurality of first internal electrode layers and the plurality of second internal electrode layers.

2. The multilayer ceramic capacitor according to claim 1, wherein an interface is between the multilayer main body and the side gap portion.

3. The multilayer ceramic capacitor according to claim 1, wherein magnesium is segregated to a portion of the side gap portion in contact with the internal electrode layer.

4. The multilayer ceramic capacitor according to claim 1, wherein the side gap portion includes:
   an inner side gap layer in contact with the multilayer main body; and
   an outer side gap layer in contact with the inner side gap layer.

5. The multilayer ceramic capacitor according to claim 1, wherein, in a cross section of the width direction and the stacking direction passing through a center or approximate center of the multilayer body, a line connecting ends at the side surface of two adjacent internal electrode layers among the plurality of internal electrode layers in the stacking direction is convex toward outside.

6. The multilayer ceramic capacitor according to claim 1, wherein the multilayer body includes rounded corners and ridges.

7. The multilayer ceramic capacitor according to claim 1, wherein the multilayer body has a dimension in the length direction of about 0.2 mm or more and about 10 mm or less, a dimension in the width direction of about 0.1 mm or more and about 10 mm or less, and a dimension in the stacking direction of about 0.1 mm or more and about 5 mm or less.

8. The multilayer ceramic capacitor according to claim 1, wherein each of the plurality of dielectric layers has a thickness of about 0.5 μm or less.

9. The multilayer ceramic capacitor according to claim 1, wherein each of the plurality of dielectric layers includes $BaTiO_3$ as a main component.

10. The multilayer ceramic capacitor according to claim 9, wherein each of the plurality of dielectric layers includes at least one of Mn compounds, Fe compounds, Cr compounds, Co compounds, and Ni compounds as a subcomponent.

11. The multilayer ceramic capacitor according to claim 1, wherein each of the plurality of internal electrode layers includes at least one of Ni, Cu, Ag, Pd, Au, or Ag—Pd alloy.

12. The multilayer ceramic capacitor according to claim 1, wherein
  each of the two side gap portions includes a dielectric material including grains; and
  a particle size of the grains of the dielectric material decreases from an inner portion towards an outer portion of the two side gap portions.

13. The multilayer ceramic capacitor according to claim 12, wherein the particle size of the grains is about 400 nm or more and about 450 nm or less at an outermost side of the outer portion, and about 600 nm or more at an innermost side of the inner portion.

14. The multilayer ceramic capacitor according to claim 12, wherein the particle size of the grains at an innermost side of the inner portion is about 1.5 times or more than the particle size of the grains at the outermost side of the outer portion.

15. The multilayer ceramic capacitor according to claim 1, wherein a thickness of each of the two outer layer portions is about 20 μm or more and about 60 μm or less.

16. The multilayer ceramic capacitor according to claim 1, wherein a thickness of each of the two outer layer portions is about 20 μm or more and about 40 μm or less.

17. The multilayer ceramic capacitor according to claim 1, wherein each of the two external electrode includes a plated layer on the conductive resin layer.

18. The multilayer ceramic capacitor according to claim 1, wherein
  each of the plurality of internal electrode layers includes the end region in contact with the foundation electrode layer, a lead-out portion connected to the end region and overlapping with only one of the first and second internal electrode layers in the stacking direction, and an opposing portion connected to the lead-out portion and overlapping with each of the first and second internal electrode layers in the stacking direction; and
  in each of the plurality of internal electrode layers, the end region is thicker than each of the lead-out portion and the opposing portion.

* * * * *